E. J. SCHNEIDER.
COOLING DEVICE FOR PNEUMATIC TIRES.
APPLICATION FILED JUNE 12, 1909.
953,299.
Patented Mar. 29, 1910.
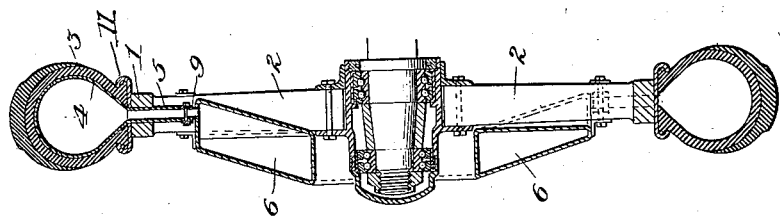
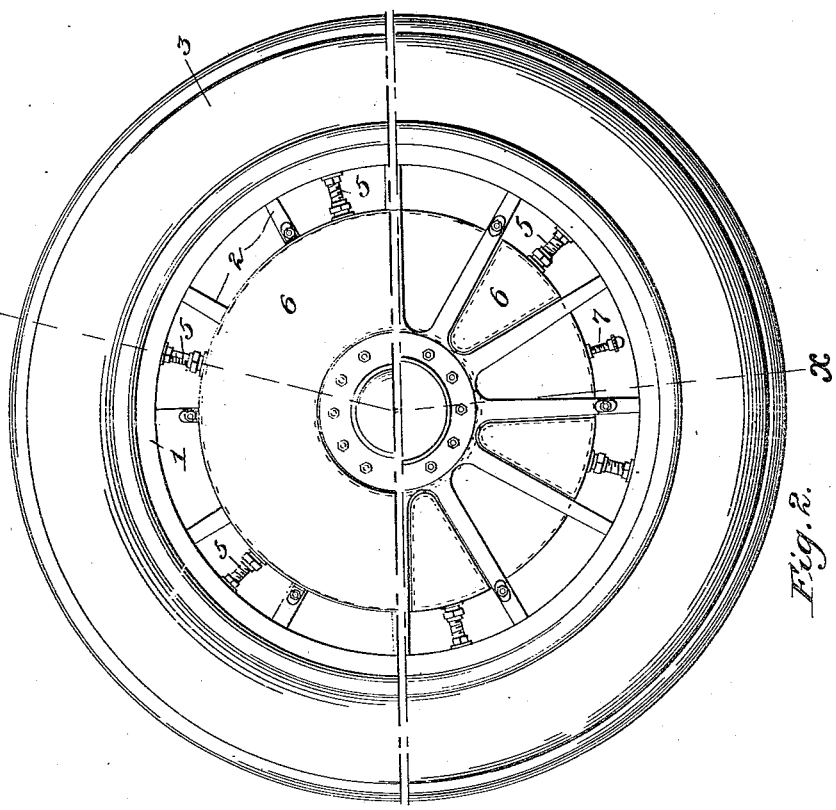
Witnesses:
C. H. Potter
N. P. Leonard
Inventor:
Edward J. Schneider
by Byrnes Townsend & Brickenstein
Att'ys

UNITED STATES PATENT OFFICE.

EDWARD J. SCHNEIDER, OF NIAGARA FALLS, NEW YORK.

COOLING DEVICE FOR PNEUMATIC TIRES.

953,299. Specification of Letters Patent. Patented Mar. 29, 1910.

Application filed June 12, 1909. Serial No. 501,822.

*To all whom it may concern:*

Be it known that I, EDWARD J. SCHNEIDER, a citizen of the United States, residing at Niagara Falls, in the county of Niagara and State of New York, have invented certain new and useful Improvements in Cooling Devices for Pneumatic Tires, of which the following is a specification.

My invention relates to a cooling device for pneumatic tires, and has for its object to provide a device which will prevent destructive heating of the inner tubes, due to friction of the air circulating around the inside of such tubes, when the automobile is in motion. At the point where the tire rests on the roadway, the tire is depressed because of the weight of the machine, and as the wheel moves, the air inside the inner tube is forced to move along in advance of this depression. To overcome this heating effect, provide a hollow disk-shaped metal chamber, in open communication with the inner tube at a number of points, this chamber being secured to the spokes of the wheel.

Referring to the drawings: Figure 1 is a half outside elevation of an automobile wheel to which my device has been applied; Fig. 2 is a half inside elevation; and Fig. 3 is a section on line $x$—$x$ of Figs. 1 and 2.

The wheel shown is of the usual type having a felly 1 having a suitable rim 11 and spokes 2. Mounted on the rim is a tire consisting of an outer tube 3, and an inner tube 4, the latter being provided with a number of hollow tubes 5, the lower ends of which form the male members of union-joints. The felly and rim have suitable openings through which these tubes project. Secured to the spokes is a hollow metal chamber 6, which is provided with a number of hollow tubes 9 arranged to form the female members of the unions. An inflating valve connection 7, of the usual type, is shown as connected to the chamber 6, although such valve might be directly connected to the inner tube. As shown, the metal chamber is provided with extensions projecting between the spokes, these extensions increasing the capacity of the chamber, to enable direct connections to be made between the chamber and the tire.

The mode of operation of the device is as follows: As the wheel moves along the air within the tire is continually forced around through the inside of the inner tube, and the friction against the walls tends to raise its temperature, which, unless some cooling means is used, may reach such a point as to destructively heat the relatively thin material of which this tube is composed. This tendency to heat is obviated by my device for the reason that the cool air from the chamber naturally tends to circulate from the chamber to the tire, and this circulation is increased by the centrifugal force, which causes the cool air to flow outward into the inner tube, thus displacing the hot air in the tire.

In case repairs are necessary, the union-joints can be detached and the inner tube removed in the usual way.

I claim:

1. The combination with the inner tube of a pneumatic tire of a hollow metal cooling chamber mounted on the outside of the spokes of the wheel and having portions of such cooling chamber extending between the spokes, and connections between the chamber and tire.

2. The combination with the inner tube of a pneumatic tire of an annular disk-shaped hollow metal cooling-chamber, means for attaching the chamber to the outside of the wheel, said chamber having portions of such cooling chamber extending inwardly between the spokes of the wheel, and detachable connections between such inwardly extending portions and the inner tube.

In testimony whereof, I affix my signature in presence of two witnesses.

EDWARD J. SCHNEIDER.

Witnesses:
FREDERICK H. BECKET,
J. N. DEINHARDT.